United States Patent Office 3,425,198
Patented Feb. 4, 1969

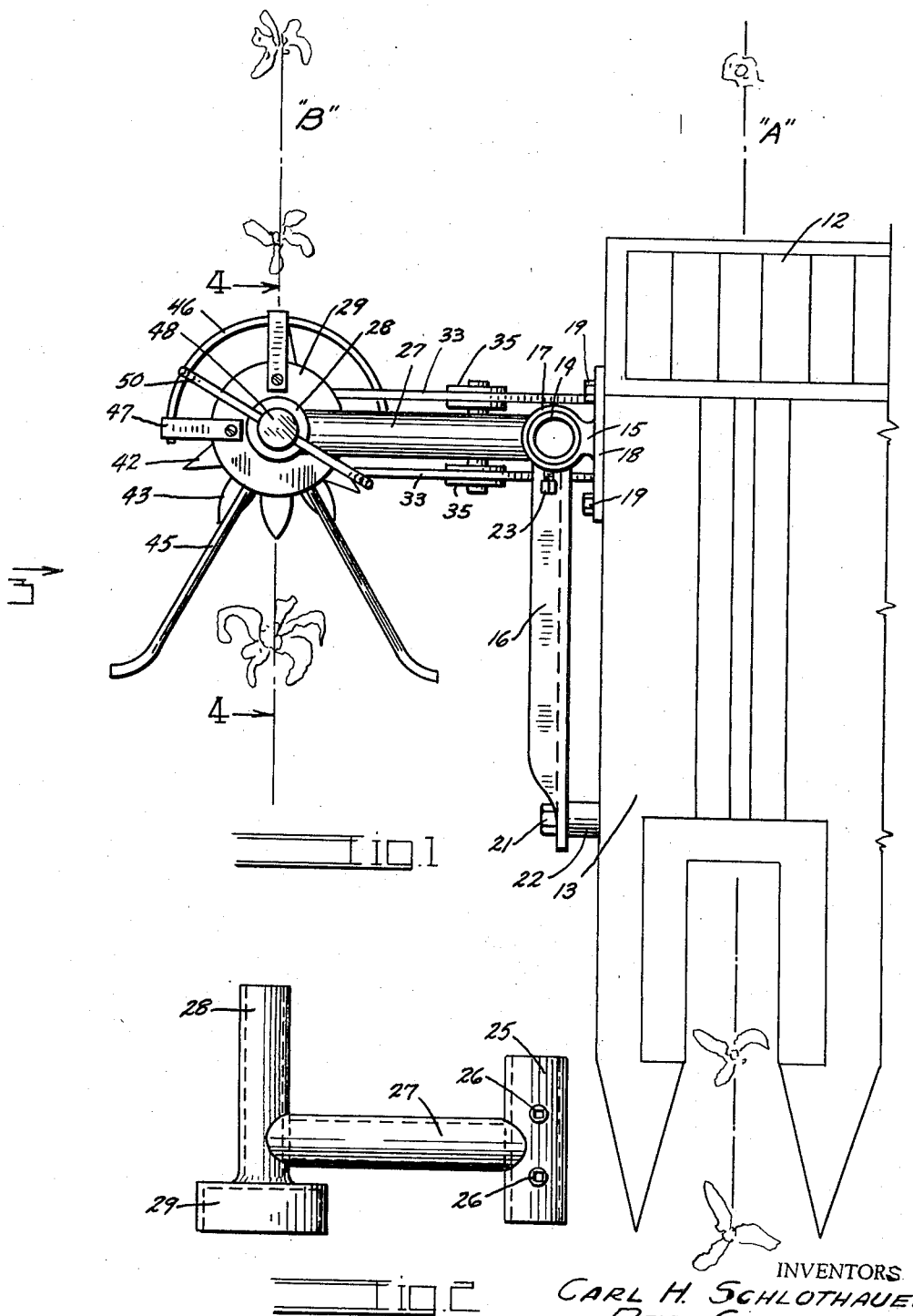

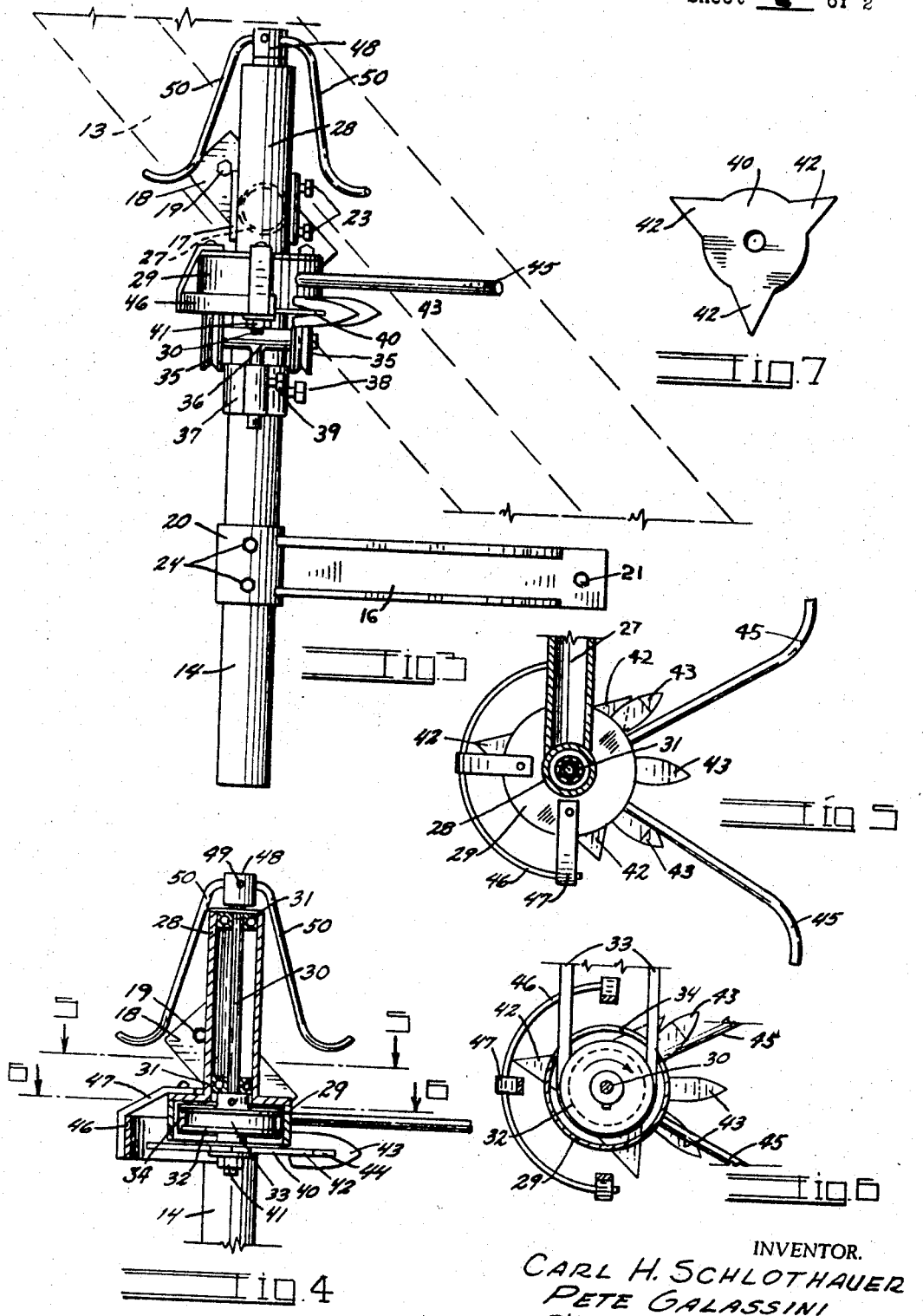

3,425,198
CORNSTALK TOPPERS
Carl H. Schlothauer, Rte. 1, Box 100, Fort Morgan,
Colo. 80701, and Pete Galassini, Fort Morgan,
Colo.; said Galassini assignor to said Schlothauer
Filed Mar. 21, 1966, Ser. No. 536,049
U.S. Cl. 56—63                                5 Claims
Int. Cl. A01d 45/02, 55/26

ABSTRACT OF THE DISCLOSURE

A vertical frame pipe adjustably secured to the side of a corn harvester, with a supporting arm adjustably mounted thereon and extending horizontally outward therefrom to support a vertical shaft housing which terminates at its lower extremity in a circular, open-bottomed, pulley housing. A knife shaft rotatably mounted in, and extending above and below, said shaft housing and through a belt pulley in said pulley housing. A bladed knife-disc mounted on the lower extremity of said shaft to cut the tops from entering stalks, and radial top-throwing arms mounted on the upper extremity of said shaft to throw the cut tops outwardly therefrom.

---

At present, corn is harvested by means of tractor-mounted harvesters or pickers having snap-units which travel along the rows of stalks and snap the ears therefrom and deposit them in trailer trucks which are attached to and follow the harvesters.

The tops of the stalks which extend above the plane of growth of the uppermost ears and the top leaves and tassels break off and fall into the snap-unit of the picker or harvester to clog the gathering and elevating chains and the feed wheels thereof so as to interfere with operation of the unit and cause trash to accumulate in the piles of ears in the trailer trucks.

The principal object of this invention is to provide a simple and highly efficient attachment for a corn harvester which, while the harvester is picking one row, will act to remove the tops from the next succeeding row so that when the harvester travels along the latter row, it will encounter no interference from the tops.

Another object is to so construct the topper that it can be quickly and easily mountd upon any of the conventional, one-row types of harvesters and pickers so as to be carried and powered by the latter.

A further object is to provide a topper which will be readily adjustable both for ear position, stalk-height, and row spacing and also for various types of harvesters and pickers.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a top plan view of the topper of this invention illustrating it attached to a conventional harvester;

FIG. 2 is a detail front elevational view of a tubular, topper-supporting-bracket to be later described;

FIG. 3 is a side elevational view of the topper looking in the direction of the arrow 3 in FIG. 1;

FIG. 4 is a vertical, axial section taken on the line 4—4, FIG. 1;

FIG. 5 is a fragmentary, horizontal section, taken on the line 5—5, FIG. 4;

FIG. 6 is a similar, horizontal section, taken on the line 6—6, FIG. 4; and

FIG. 7 is a detail, top view of a knife disc as employed in this invention.

In FIG. 1, the relative positions of two rows of corn are indicated at A and B and a conventional, one-row corn picker or harvester is diagrammatically indicated at 12 with its "snap-unit" at 13. The "snap-unit" is inclined rearwardly and upwardly and acts to gather the stalks, snap the ears therefrom and elevate the snapped corn to a husker or conveyor assembly. The picker or harvester, per se, forms no part of the present invention other than to provide means for properly supporting and driving the cornstalk topper hereinafter described.

The topper is secured to the snap-unit 13 by means of a vertical frame pipe 14 which is attached to the side of the snap-unit 13 by means of an upper bracket member 15 and a lower bracket arm 16. The upper bracket member 15 is provided with a pipe sleeve 17 to receive the frame pipe 14 and with a foot plate 18 designed to be attached to the inclined side of the snap-unit 13 through the medium of lag screws or attachment bolts 19. The lower bracket arm 16 is also provided with a pipe sleeve 20 at its rear extremity, to receive the frame pipe 14, and is secured, at its forward extremity, to, and spaced from, the inclined side of the snap-unit 13 through the medium of a suitable bolt 21 and spacing sleeve 22. The pipe sleeves 17 and 20 vertically align with each other and the frame pipe 14 can be preset at any desired vertical position therein by means of set screws 23 in the sleeve 17 and similar set screws 24 in the sleeve 20.

The topper is supported from the frame pipe 14 through the medium of the supporting bracket as shown in FIG. 2. The latter bracket comprises a vertical pipe collar 25, adapted to surround the frame pipe 14, which may be preset in any desired vertical or radial poistion on the frame pipe by means of suitable set screws 26. A horizontal tubular arm 27 is secured to and extends radially from the collar 25 to vertically support a tubular shaft housing 28 which terminates at its lower extremity in a circular, open-bottomed, pulley housing 29.

A knife shaft 30 is vertically and axially journalled in the shaft housing 28, in suitable antifriction bearings 31 of the thrust type, so as to extend above and below the housing 28. A belt pulley 32, preferably of the V-belt type, is affixed to the shaft 30 within the confines of the pulley housing 29 and an endless V-belt 33 extends from about the pulley 32, through a belt opening 34 in the side of the housing 29, to any suitable power source in the harvester 12.

Conventional snap-units contain belts and pulleys for driving gathering chains to gather the corn stalks. It has been found that the belt 33 can be easily connected with the belt systems of the snap-unit for transmitting rotation to the knife shaft 30 in the direction of the arrow in FIG. 6.

The intermediate reaches of the belt are supported, and aligned with the pulley 32, by idler pulleys 35 which are rotatably supported on opposite sides of a T-shaped axle bracket 36. The stem of the axle bracket 36 is adjustably supported from a cylindrical sleeve 37 surrounding the frame pipe 14. The sleeve 37 can be set in any desired vertical and radial position on the pipe 14 by means of set screws 38 and the axle bracket 36 can be similarly preset by means of a set screw 39. Thus the belt drive can be readily adapted to the requirements of the particular implement to which the topper is applied.

A knife disc 40 is fixedly mounted on the lower extremity of the shaft 30 below the pulley 32 in any suitable manner, such as through the medium of a clamp washer and nut 41. The knife disc is preferably of the type shown in FIG. 7 to provide a plurality of radially extending shearing blades 42 which rotate in a horizontal plane below, and project radially beyond, the pulley housing 29. A plurality, preferably three, of pointed guards 43, somewhat similar to the conventional sickle guards as employed on reapers and the like, are welded to, and project radially and forwardly from, the pulley housing 29. The guards 43 are provided with sickle slots 44 through which the shearing blades 42 travel as the disc 40 rotates so as to exert a shearing action on the entering stalks.

The entering stalks are gathered and directed between the guards by two gathering rods 45 which are welded or otherwise secured to the pulley housing 29 at their rear extremities and extend forwardly in a horizontal plane and in flaring relation to each other. A semi-circular knife shield 46 is supported on brackets 47 from the housing 29 about the rear 180° of the knife path to prevent accidental contact with the blades 42.

A shaft cap 48 is affixed to the upwardly projecting extremity of the knife shaft 30 in any suitable manner such as by means of a set screw 49. Two top-throwing-arms 50 are affixed to and project radially and oppositely outward from the shaft cap 48. The arms could be formed by passing a single rod through the cap and bending the two extremities downwardly and outwardly in flaring relation, as shown in the accompanying drawings, to a position immediately above the tubular arm 27.

In use, the snap-unit of the harvester is aligned with the corn row A and the supporting bracket of the topper is adjusted on the frame pipe 14 to position the axis of the knife shaft 30 in alignment with row B. The supporting bracket is vertically adjusted to position the knife disc 40 on a plane above the uppermost ears and below the top of the stalks in row B. The harvester is then driven forwardly (downwardly in FIG. 1) to gather, snap, elevate and deliver the ears. As the harvester progresses, the topper will travel along row B to gather and cut away the tops in the latter row. As the cut tops fall, they will be engaged by the rapidly revolving top-throwing arms 50 which act to toss and throw the cut tops away from the harvester. The harvester is then taken to the opposite side of the field and driven along a row in the opposite direction then back to the first side and down row B. Thus, the harvester or picker is always operating on a topped and cleaned row so that the objectionable top difficulties are avoided.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A topper for removing the tops from a second row of cornstalks during the passage of a harvester along a parallel first row of cornstalks comprising:
  (a) a vertical knife shaft housing;
  (b) means for supporting said knife shaft from said harvester in alignment with said second row and in a plane above the ears on the stalks in said second row;
  (c) a vertical knife shaft axially journalled in said housing and projecting above and below the latter;
  (d) a toothed knife disc mounted on the lower extremity of said shaft poistioned to contact and sever the tops from the stalks in said second row; and
  (e) throwing arms mounted on the upper extremity of said knife shaft and extending radially and downwardly to contact and throw the severed tops in consequence of rotation of said shaft.

2. A topper as described in claim 1 having:
  (a) a circular, open-bottomed, housing horizontally mounted on said knife shaft housing above said knife disc;
  (b) a plurality of guards mounted on and extending radially forward from said circular housing in spaced relation, the teeth of said knife disc passing through said guards to exert a shearing action on corn stalks entering between said guards.

3. A topper as described in claim 2 having two gathering rods mounted on said circular housing and extending forwardly and radially from said housing and acting to contact and direct said stalks between said guards.

4. A topper as described in claim 2 having:
  (a) a belt pulley mounted on said knife shaft within the confines of said circular housing;
  (b) an endless belt trained about said pulley and extending to a power source in said harvester; and
  (c) idler pulleys rotatably supported from said frame pipe and contacting said belt and acting to maintain the latter in alignment with said first belt pulley.

5. A topper as described in claim 1 in which the means for supporting said knife assembly comprises:
  (a) a vertical frame pipe;
  (b) means for securing said frame pipe to a side of said harvester;
  (c) a pipe collar mounted on, and vertically and radially adjustable on, said frame pipe; and
  (d) a horizontal arm secured at its extremities to said pipe collar and said shaft housing, respectively, and supporting the latter in a vertical position.

References Cited

UNITED STATES PATENTS

| | | | |
|---|---|---|---|
| 601,764 | 4/1898 | Tilley et al. | 56—57 |
| 1,091,119 | 3/1914 | Cannon | 56—57 |
| 1,362,912 | 12/1920 | Aulman | 56—59 |

ROBERT E. BAGWILL, *Primary Examiner.*

U.S. Cl. X.R.

56—16